United States Patent [19]

F'Geppert

[11] Patent Number: 4,679,459
[45] Date of Patent: Jul. 14, 1987

[54] CONCAVE-CONVEX GEAR PAIR HAVING STAGGERED TEETH

[75] Inventor: Erwin F'Geppert, Oakland County, Mich.

[73] Assignee: The United States of America as represented by the Secretary of the Army, Washington, D.C.

[21] Appl. No.: 855,869

[22] Filed: Apr. 22, 1986

[51] Int. Cl.$^4$ ............................................. F16K 55/17
[52] U.S. Cl. ............................................. 74/460; 74/462
[58] Field of Search ............... 74/460, 462, 440, 443, 74/444, 445

[56] References Cited

U.S. PATENT DOCUMENTS

| | | | |
|---|---|---|---|
| 1,345,717 | 10/1920 | Bertels | 74/440 |
| 4,106,360 | 8/1978 | Manna | 74/440 |
| 4,140,026 | 2/1979 | Rouverol | 74/462 X |
| 4,155,686 | 5/1979 | Eisenmann et al. | 74/462 X |
| 4,437,356 | 3/1984 | Imazaike | 74/443 X |

Primary Examiner—Kenneth Downey
Attorney, Agent, or Firm—Peter A. Taucher; John E. McRae

[57] ABSTRACT

A spur gear system wherein each gear comprises two gear sections; gear teeth in the respective sections are staggered a one half tooth pitch distance. The effect is to achieve a relatively high contact ratio with relatively small diameter gears. Teeth on mating gears are of positive (convex) curvature and negative (concave) curvature to provide an enlarged contact area.

1 Claim, 7 Drawing Figures

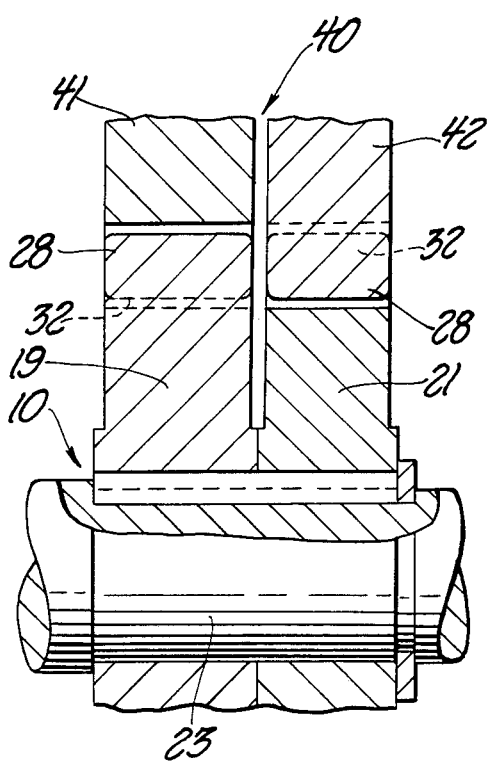
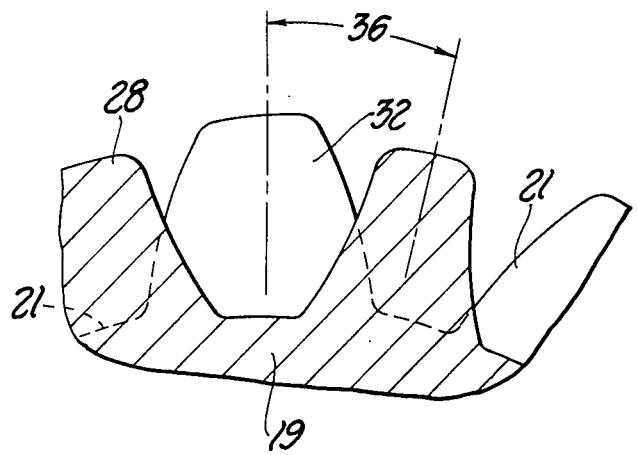
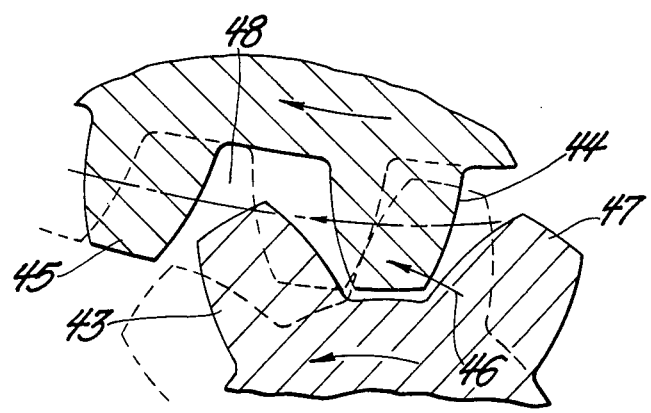
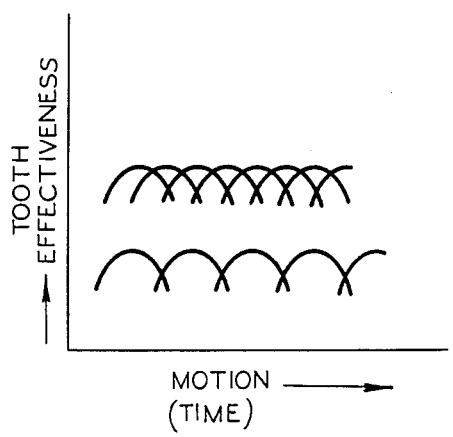

CONCAVE-CONVEX GEAR PAIR HAVING STAGGERED TEETH

GOVERNMENT INTEREST

The invention described herein may be manufactured, used, and licensed by or for the Government for governmental purposes without payment to me of any royalty thereon.

SUMMARY OF THE INVENTION

This invention relates to spur gear systems. Objects of the invention are to provide a spur gear system wherein:
1. wear on the pressure faces of the gear teeth is fairly uniform, from the tip to the root area of each tooth.
2. contact area between the pressure faces on engaged teeth is relatively large, for achievement of low unit area forces.
3. each gear is constructed with circumferentially staggered teeth, whereby satisfactory contact ratios are obtainable even though one of the gears has a relatively small diameter.

THE DRAWINGS

FIG. 4 fragmentarily illustrates a gear system constructed according to my invention.

FIG. 5 is a fragmentary end elevational view of the FIG. 4 system.

FIG. 6 is a fragmentary sectional view showing gear teeth engagement action.

FIG. 7 is a chart illustrating contact ratios achieved with different gear systems.

Figure 1:
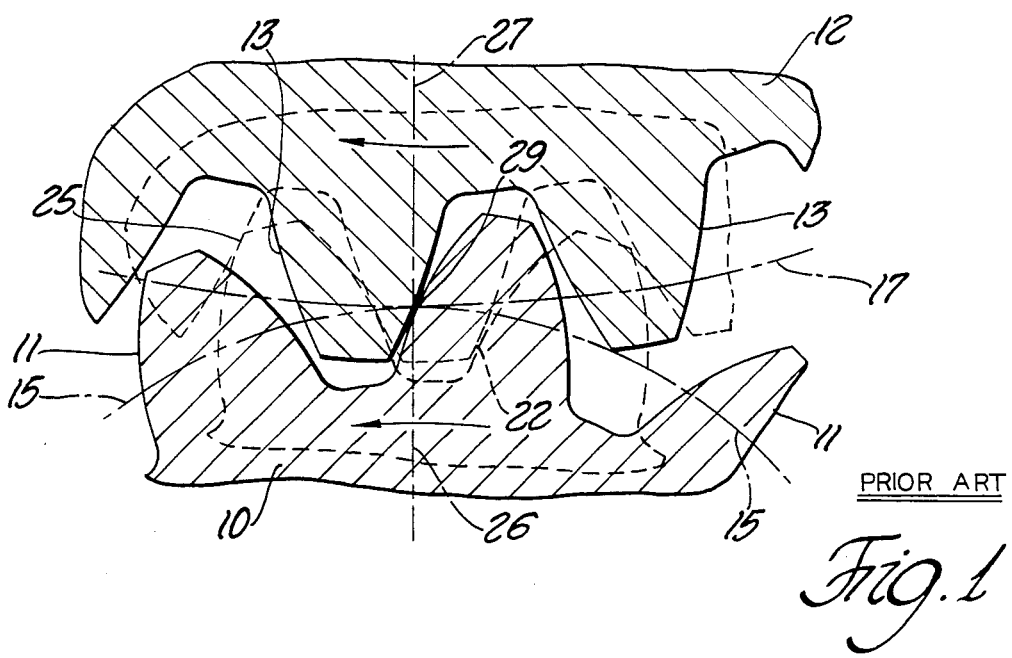
FIG. 1 is a fragmentary sectional view through a conventional spur gear system employing convex involute profile configurations.

Referring more particularly to FIG. 1, there is shown a conventional spur gear system comprising a first spur gear 10 having teeth 11, and a second gear 12 having teeth 13. Numerals 15 and 17 represent the pitch circles for the two gears. The pressure faces on the gears have convex involute profile configurations. Each gear is shown in two positions, namely the full line position and a dashed line position; the two positions depict gear motion.

Assuming gear 10 is the drive gear and gear 12 is the driven gear, the pressure face on any tooth 11 will start to engage the pressure face on mating tooth 13 at approximately point 22; the pressure face on any tooth 11 will leave the pressure face on mating tooth 13 when the contact point (line) is at location 25. During movement of gear 10 in a counter-clockwise direction the contact zone on tooth 11 will shift between points 22 and 25. Such shift will be reflected as a slight sliding motion of one pressure face on the other pressure face.

Such sliding motion will produce wear (over time), except at points 29 on the associated pitch circles. At points 29 on the pitch circles the pressure faces are moving tangent to the common radius lines 26 and 27 generated from the two gear axes. At points 29 the pressure faces will have less wear than at other points on the gear pressure faces (due to the lack of sliding action).

Figure 3:
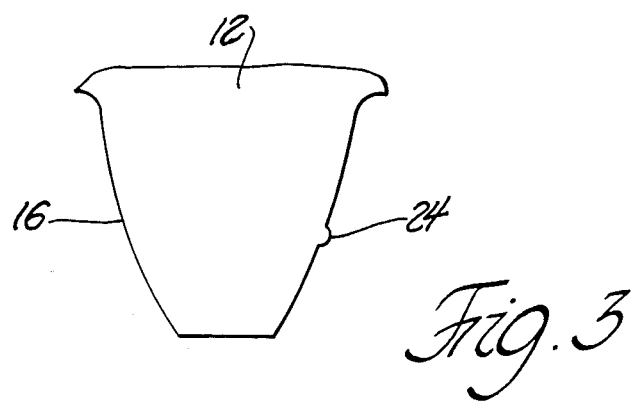
FIG. 3 illustrates a tooth used in the FIG. 1 gear system, with surface areas worn away to produce a defect condition.

The lack of wear on points 29 produces a small ridge, as designated by numeral 24 in FIG. 3. This ridge is objectionable in that it can suddenly break off from the gear and fall into the spaces between mating gear surfaces. The chip(s) can act as a grinding mechanism to degrade the gear faces. Additional chips can be generated, leading to premature failure of the gear system.

Figure 2:
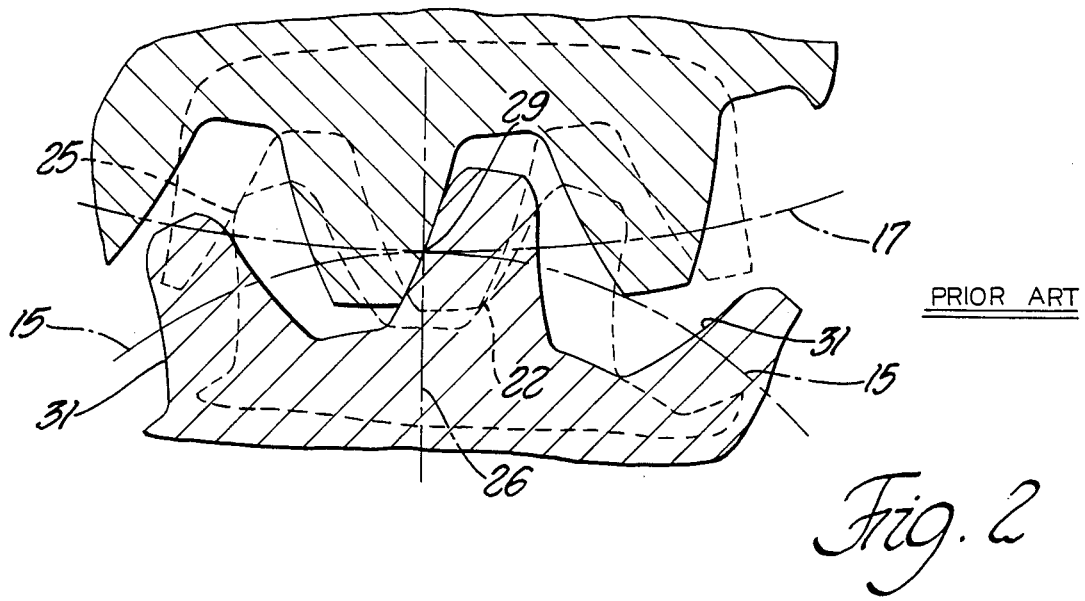
FIG. 2 is a view similar to FIG. 1, but with some gear surfaces having convex profile configurations and some mating gear surfaces having concave profile configurations.

A known gear system depicted in FIG. 2 has some advantages over the FIG. 1 gear system. In the FIG. 2 system the teeth on gear 10 have curved concave pressure faces 31. Initial contact occurs at location 22; the gear surfaces disengage at location 25 on face 31.

As with the FIG. 1 gear system, there is a sliding or wiping action of one pressure face on the other pressure face as the gear teeth transmit the drive force from gear 10 to gear 12. However the wiping action is somewhat different in that the wiping direction is unidirectional rather than bidirectional. In the FIG. 1 gear system the pressure face on gear tooth 11 slides upwardly on the pressure face of tooth 13 until it reaches location 29; then it begins sliding downward. In the FIG. 2 system the sliding action is downward through the entire period of tooth engagement. There is a lessened tendency to form the objectionable ridge 24 (FIG. 3).

The FIG. 2 system is advantageous over the FIG. 1 system for the additional reason that the contact area is somewhat enlarged. When two convex surfaces engage (as in FIG. 1) there is thin line contact. When a concave surface engages a convex surface (as in FIG. 2) the contact becomes "thick line" in nature. In each case pressure forces slightly deform the faces to thereby increase the width of the line contact; however, with the FIG. 2 system the width of the line contact is further increased due to the wrap-around action of the concave surface on the convex surface. The increased width of the line contact produces smaller unit area forces, which is desirable for maintaining structural integrity of the system.

My invention is illustrated in FIGS. 4 and 5. The system uses the concave-convex tooth profiles depicted in FIG. 2. Additionally, the system uses a staggered tooth feature that contributes to higher contact ratios. The term "contact ratio" is here taken to mean the average number of tooth engagements occurring during any given cycle.

In the FIG. 4 system gear 10 is formed out of two axially aligned gear sections 19 and 21. These two gear sections are rigidly attached to shaft 23 in any conventional fashion. Each gear section 19 or 21 is actually a complete gear, such that each gear section is manufacturable and installable on shaft 23 independently of the other gear section.

Gear section 19 has teeth 28 whose pressure faces are concave, per the practice illustrated at 31 in FIG. 2. Gear section 21 has teeth 32 whose pressure faces are convex, per the practice illustrated in FIG. 1. Gear sections 19 and 21 are installed on shaft 23 so that teeth 28 and 32 are circumferentially staggered from one another by a one half tooth spacing, as shown in FIG. 5 (numeral 36).

The above-described gear 10 (comprised of gear sections 19 and 21) is designed to mesh with a second gear designated generally by numeral 40. Gear 40 is constructed similarly to gear 10 except that it may have a different diameter and tooth complement. Gear 40 includes a first gear section 41 having teeth 32 formed with convex pressure faces. Gear 40 also includes a second gear section 42 having teeth 28 formed with concave pressure faces. Teeth 32 and teeth 28 are circumferentially staggered, in the fashion illustrated in FIG. 5.

Gears 10 and 40 are oriented so that teeth 28 on gear section 19 mesh with teeth 32 on gear section 41, and teeth 32 on gear section 21 mesh with teeth 28 on gear section 42. The principal difference between the gear system shown in FIGS. 4 and 5 and the gear system shown in FIG. 2 is the tooth staggering depicted in FIG. 5. The FIG. 2 gear system does not have this feature.

The staggered tooth feature is advantageous in that it should permit use of smaller diameter gears and larger speed changes (between the small diameter gears and the large diameter gear). With the staggered tooth feature the number of teeth on a given gear (10 or 40) is effectively doubled, thereby increasing the contact ratio.

Speed change systems often include large diameter spur gears meshing with small diameter pinion gears; speed change (increase or decrease) is proportional to the relative diameters of the two gears. If the small diameter gear could be made relatively small the large diameter gear could be proportionally small. Thus, assuming a 4 to 1 speed change requirement, if we can make the small gear with a 2 inch diameter the large gear can have a diameter of 8 inch, whereas if the small diameter gear is required to be 4 inch then the large diameter gear has to be 16 inches.

The overall size of the speed change system is somewhat related to the minimum attainable diameter for the small diameter pinion gear. The minimum pinion gear diameter is dictated to a certain extent by the following factors:
1. sufficient tooth thickness for the load
2. sufficient tooth clearance spaces
3. sufficiently high contact ratio (average numbers of teeth in contact)
4. avoidance of discontinuity of action (condition where teeth are out of contact)
5. low approach angles for the teeth on the small pinion.

Attached FIG. 6 illustrates some of the problems associated with the design of spur gear speed change systems. In the full line position tooth 47 on a small pinion is beginning to engage tooth 44 on a large gear. At this point in the cycle there danger of discontinuity of action. (if teeth 47 and 44 are not yet engaged). A related problem is low contact ratio (because the entire load is carried by a single tooth pair). Another problem is the fact that tooth 44 is required to carry the load near its outer tip; the outer tip area is the weakest part of the tooth.

Another disadvantage of the FIG. 6 system is the fact that tooth 47 exerts its force on directional line 46 that is at an acute angle to pitch circle 48 of the larger gear; the arrow 46 force is only partially effective to turn the large gear. The dashed lines in FIG. 6 show the teeth at what might be termed the "best" point in cycle, i.e., the point where the turning efficiency is highest and the loads on the tooth surfaces are lowest. The full line position indicates one of the points in the cycle where the turning efficiency is the lowest, and the unit loads on the tooth surfaces are highest.

The various design problems are usually solved by making the small diameter pinion gear with a fairly large diameter (in absolute terms). My invention seeks a gear design wherein the small diameter gear can have a smaller diameter than heretofore believed possible. This should enable the large diameter gear to be smaller (for a given speed change); alternately if the diameter of the large gear is kept the same then a greater speed change can be attained for a single gear pair. End result is a smaller (and cheaper) speed change unit for a given speed change requirement and loading requirement.

The invention contemplates a spur gear system wherein each gear in the gear pair comprises two sets of gear teeth; one set of teeth is circumferentially offset from the other set of teeth by one half the pitch angle (distance). With this arrangement the teeth on the smaller (pinion) gear remain engaged with the teeth on the larger gear wheel for a relatively great angular distance. The system achieves a high contact ratio without discontinuity of action.

One related advantage of my proposed arrangement (FIGS. 4 and 5) is that the total tooth engagement area remains relatively constant; there is some fluctuation, but of a lesser magnitude than that experienced with conventional spur gear arrangements.

In spur gear systems each "new" tooth enrering the tooth engagement zone begins to engage the mating tooth near its inner root; at or about the same time the outer tip area of an "old" tooth leaves the tooth engagement area. While the tooth is entering or leaving the tooth engagement zone its pressure face exerts a force at an acute angle to the gear pitch circle; such acute angle action is only partially effective to drive the driven gear. The gear tooth has maximum effectiveness when its pressure face is acting on the pitch circle. With the arrangement shown in FIGS. 4 and 5 the periods of maximum tooth effectiveness tend to occur more frequently so that drive action is relatively more constant compared to conventional arrangements.

FIG. 7 is a graph showing generally how the tooth effectiveness varies during the cycle; each curve on the graph represents a tooth engagement period. The lower curves in the graph illustrate the conventional arrangement; the upper curves show my improved arrangement. In each case the effectiveness of a given tooth rises from a low value to a higher value, then drops off. As one tooth leaves the engagement zone another tooth enters the engagement zone; if the new tooth is sufficiently close to the old tooth the curves for the different teeth will overlap, as shown in FIG. 7 (both curves).

In the upper curve (FIG. 7) the curve segments overlap more frequently, compared with overlapments obtained with the lower curves. The overall effectiveness of the system is therefore more relatively constant, without the valleys that characterize the lower curves.

Valleys in the FIG. 7 curves represent periods of high loadings on the individual gears. My newly proposed arrangement avoids such periodic high loading conditions, and thus (hopefully) permits the gear system to operate with a greater safety factor and/or a longer service life. A principal advantage of the new gear system is that the ratio of the small gear diameter to the large gear diameter can be increased (compared to conventional arrangements). The new gear system therefore can be used to achieve a greater speed change for a given gear pair. In some cases the new system would permit a reduction in the number of gear pairs, and hence in the overall size of the system. It is also believed that the new system would have a greater service life and/or perform better in high load conditions because the individual gear teeth would not be exposed to the same high peak loadings as the teeth in conventional arrangements.

The proposed gear system is also believed to have some potential advantages as regards gear inventory requirements. For a given diameter gear it is necessary to carry in inventory two gear sections, e.g. gear sections 19 and 21. With the FIG. 2 system two gears are also required for each gear diameter, i.e. a gear having concave pressure faces and a second gear having convex pressure faces. However, the gears in the FIG. 2 system are full width gears; whereas the gears required in the proposed system are partial width gears. Such partial width gears should be less costly than the full width gears used in the FIG. 2 system. Some saving in inventory costs would be expected with the proposed gear system.

I wish it to be understood that I do not desire to be limited to the exact details of construction shown and described for obvious modifications will occur to a person skilled in the art, without departing from the spirit and scope of the appended claims.

I claim:

1. In a speed change spur gear system, a pair of external spur gears having their teeth in meshed engagement; one spur gear having a relatively small diameter, and the other spur gear having a relatively large diameter; each spur gear being comprised of two axially aligned gear sections arranged so that the teeth on one gear section are circumferentially staggered from the teeth on the other gear section by a one half tooth spacing; the teeth on each one gear section having pressure faces that are convex in the radial plane; the teeth on each other gear section having pressure faces that are concave in the radial plane; the two spur gears being oriented so that the concave tooth surfaces on one gear are engaged with the convex tooth surfaces on the other gear, and the convex tooth surfaces on said one gear are engaged with the concave tooth surfaces on the other gear; the concave pressure faces being designed to serve as drive surfaces or driven surfaces, the convex pressure faces being designed to serve as driven surfaces or drive surfaces; the curvatures on the gear teeth pressure faces being such that a unidirectional wiping action is produced as the pressure faces move against one another; the gear sections in each spur gear having substantially the same width in the axial dimension; each gear section being formed separately from its companion gear section; each spur gear comprising a mounting shaft and a pair of separately-formed gear sections keyed onto said shaft.

* * * * *